Nov. 12, 1968  G. FLEISSNER  3,410,119
APPARATUS FOR THE WET-TREATMENT OF MATERIALS
Filed Nov. 22, 1965  2 Sheets-Sheet 1

Inventor:
GEROLD FLEISSNER
BY Dicke & Craig
ATTORNEYS (A-A)

United States Patent Office 3,410,119
Patented Nov. 12, 1968

3,410,119
APPARATUS FOR THE WET-TREATMENT OF MATERIALS
Gerold Fleissner, Egelsbach, near Frankfurt am Main, Germany, assignor to Anstalt fur Patentdienst, Vaduz, Liechtenstein
Filed Nov. 22, 1965, Ser. No. 508,933
Claims priority, application Germany, Nov. 21, 1964, A 47,664; Apr. 13, 1965, A 48,913
14 Claims. (Cl. 68—62)

ABSTRACT OF THE DISCLOSURE

A device for the wet treatment of textile materials which comprises a container means at least partially filled with a treatment liquid, at least one sieve drum means subjected to a suction draft rotatably disposed within said container means, inlet means for introducting the material to be treated to the container means, means associated with the sieve drum means for producing the suction draft causing the liquid to flow from the container into the sieve drum interior thereby forcing said material against the sieve drum means, and baffle plate means mounted in the sieve drum means below the liquid level and operable to interrupt the suction draft over a portion of the sieve drum means, said baffle means being associated with an exhaust connection which has a suction opening disposed substantially below the liquid level.

---

The present invention relates to an apparatus for the wet treatment, especially for scouring and impregnating, of fibrous or grainy materials, especially of loose, fibrous material. The device according to the present invention is equipped with at least one sieve drum subjected to a suction draft in which a liquid flow from the outside into the sieve drum is created by the suction draft which flow forces the fibrous material against the sieve drum and rinses the material. A baffle plate within the sleeve drum interrupts the suction draft over at least one portion of the sieve drum.

For a wet treatment, especially for the scouring of raw wool and similar materials, a number of devices are known. In one of the known devices, the raw wool or similar fibrous materials is carried through the treatment liquid between two conveyor belts.

In other, similar device, the treatment liquid is simultanesously passed through the material to be treated by means of jets. This requires a relatively large amount of energy, since the two conveyor belts and the material held in a compressed condition on and/or in between the two belts offer a considerable resistance. Furthermore, it is difficult in such prior art installations to effectively dissolve the dirt particles and to remove the same.

Furthermore, devices with sieve drums subjected to a suction draft are known in which the suction draft is interrupted at one portion of the sieve drum by means of a baffle plate. In the known device, the baffle consists of semi-cylindrical carriers on which the cylinder glides. If the baffle is formed of cylindrical carriers, it is necessary to slidably fit the cylinder on the cylinder carrier which, in turn, requires an extremely accurate manufacture of the sieve cylinder and the cylinder carrier. Accurate manufacture makes the device more expensive and, owing to the friction between cylinder and cylinder carrier, both parts are subjected to more wear and tear. The particles ground off during relative movements of the cylinder and cylinder carrier contaminate the treatment bath and are deposited on the fibrous material which acts as a filter.

In order to avoid these disadvanatges, it has already been suggested to form the baffle in the sieve drums of essentially straight sheets which divide the sieve drum into at least two spaces in a device with sieve drums which are preferably immersed only partly into the liquid. One of these two spaces is subjected to a suction draft, while the other one is not subjected to a suction draft. In order to obtain a good treatment effect and good guidance of the material in the liquid, it is of advantage to mount the baffle immediately below the liquid level in the sieve drum.

A baffle in a drum which is partially immersed into the liquid offers the advantage that essentially more powerful suction drafts can be applied than in a device without baffle plates since the liquid level in the sieve drum cannot sink as compared with the liquid level outside the sieve drum. Thus, forming of the treatment liquid due to too large a difference between the liquid level outside the sieve drum and the liquid level inside the sieve drum is avoided. However, more important is that, owing to the baffle plate, the material is better detached from the drum at the point of passage from one conveying means to the next one.

Tests have, however, shown that mounting of a baffle plate immediately below the liquid level also presents some problems. It has been found that if the liquid level sinks below the baffle, an air-liquid mixture is sucked off which causes considerable foaming of the liquid. Foaming of the liquid, however, is most undesirable because, on the one hand, the foam emerging from the bath will soil the vicinity of the wet treatment device and because, on the other hand, the liquid loss is considerable.

The present invention has the task to provide a device in which the aforementioned disadvantages are avoided in a simple way.

In accordance with the instant invention, this task is solved with a device of the kind described in the beginning in which the baffle consists of essentially straight sheets which are preferably mounted slightly below the liquid level whereas the openings of the exhaust connection are arranged considerably below the liquid level. By this combination of baffle plates with suction openings considerably below the liquid level, the advantage of baffle plates immediately below the liquid level are maintained whereas the aforementioned disadvantages are eliminated because now, even if the liquid level sinks below the baffle plates, only liquid and not a liquid-air mixture is sucked off.

In one simple embodiment of the present invention, the exhaust connections are fastened to the baffle plate. It is of advantage if the exhaust connections are extended conically in the direction of the suction opening.

In another embodiment of the present invention, it is suggested to arrange a channel on the baffle, preferably above the baffle plate for the lateral removal of the liquid sucked into the sieve drum. In accordance with another object of the present invention, the wall of the channel is provided with openings at the point of material passage of the sieve drum which openings can be preferably adjusted and closed, through which liquid emerges which facilitates detachment of the material from the sieve drum and which, at the same time, removes all fibers and/or material residues from the sieve drum.

According to another object of the present invention, the pumps for sucking off the liquid in the sieve drum are arranged at and/or mounted on the baffle.

Instead of arranging the exhaust connections at the baffle plate, it is also possible to arrange the same on one or both faces of the sieve drum. In another embodiment of the present invention, it is suggested to use a perforated tube as an exhaust connection which extends preferably over the whole length of the sieve drum. By means of this perforated tube, a uniform suction draft over the whole length of the sieve drum is ensured.

Another significant feature and characteristic of the present invention resides in connecting the exhaust connections of all or at least of a group of sieve drums with a common suction chamber arranged preferably at the sides of the sieve drum so that only one suction device is required for all and/or for at least one group of sieve drums. This does not only make the wet treatment device with several sieve drums cheaper, but it also improves the economy since, in general, the efficiency of one larger, high-capacity suction pump is better than that of a number of smaller suction pumps.

Another object of the instant invention is to turn the liquid sucked off into the liquid bath at the intake side of the device, i.e., at the beginning of the bath, and/or in such a way that a slight flow in the direction of material passage is created in the bath. This makes it also possible that, according to another object of the present invention, the sieve drums in a device for the treatment of loose, fibrous material are arranged at a certain distance from each other so that a floating distance for the fibrous material exists between the individual sieve drums, over which distance the dissolved dirt particles which are being detached from the fibers may sink down and over which the loose, fibrous material may form a fleece of uniform thickness.

The scouring effect is very much improved by the provision of individual floating distances between the sieve drums. It has been found that usch floating distances almost double the scouring effect per sieve drum. Therefore, essentially fewer sieve drums ensure the same scouring effect and/or wetting effect in a device with sieve drums subjected to a suction draft and with floating distances arranged between the sieve drums. This does not only render the device cheaper but also more economical.

Another essential improvement of the treatment effect can, in accordance with the prehent invention, be achieved if at least one rinsing device is arranged at the material intake which rinsing device is fed with at least part of the treatment liquid sucked out of the sieve drum or sieve drums. The rinsing device may be arranged above a conveyor belt which carries the material or above a floating distance of the treatment bath. The rinsing device pre-wets the material and thus dissolves the dirt particles so that there exists a good cleaning effect already on the first sieve drum. Instead of a conveyor belt also a floating distance for the fibrous material to be treated may be provided, above which floating distance the rinsing device is arranged. The treatment effect is almost as good.

The rinsing device may be equipped with a closed or open rinsing box. In order to make the device independent of the quantity of treatment liquid fed, the rinsing boxes are provided with an overflow line through which the excess liquid fed is returned preferably to the bath intake so that a flow in the direction of material passage is created in the bath or that this flow is favored and promoted. In the case of closed rinsing boxes, an excess pressure valve may be provided in the overflow line.

According to another object of the instant invention, the contact surface of the conveyor belt should lie immediately, i.e., preferably by the thickness of the material layer, below the liquid level. This arrangement of the conveyor belt ensures that the material to be cleaned is covered by the liquid and transported through the bath without too many relative motions of the fibers which would result in felting.

In another embodiment of the invention it is suggested to subject the contact surface of the conveyor belt to a suction draft, e.g., by means of a pumping device which sucks the treatment liquid from below the contact surface of the conveyor belt and returns it into the bath above the contact surface, possibly by way of rinsing boxes. An unfavorable effect, e.g., felting by liquid dripping down, does not occur in that case because the material is covered by the liquid.

A sieve drum with a suction device as a conveying means and preferably a pair of rollers for squeezing the liquid out of the fibers are arranged behind the conveyor belt.

According to another object of the present invention, it is suggested to divide the bath container into a suction chamber below the conveyor belt and a suction chamber below the sieve drum, to connect the two suction chambers, and to return the treatment liquid sucked off the sieve drums at least partially into the bath above the conveyor belt. In such a construction and design it is made sure that the treatment liquid is permanently sucked through the fiber fleece floating in the treatment liquid on the conveyor belt in a direction from above to below, and that, in this way, the fiber fleece is held on the conveyor belt which, on the one hand, results in safe transportation and which, on the other hand, prevents felting of the material. At the same time the loose dirt particles are floated downwards and are allowed to settle, e.g., on the bottom of the container.

In order to separate contaminations from the treatment liquid and in accordance with another object of the present invention, it is suggested to arrange a perforated bottom below the conveyor belt. Possibly this perforated bottom need not be provided; in that case, the settling boxes arranged below or the settling box arranged below the conveyor belt are provided with an open bottom which ends in another settling container which is connected with at least that part of the bath which lies below the sieve drum.

In order to avoid that individual fibers or part of the fibers are drained off the sides of the conveyor belt and are deposited in the bearing or on the bottom of the container, and in accordance with another object of the present invention, it is suggested to seal the conveyor belt laterally by guiding boxes which are provided with openings directed towards the material through which openings liquid emerges. By that liquid the material at the margins of the fiber fleece is always floated slightly towards the middle. Thus the material cannot drop off the conveyor belt or be drained off the conveyor belt. The boxes for sealing the conveyor belt may be connected with the suction device of the sieve drum and part of the liquid sucked off may be returned through the boxes into the bath. However, they may also be connected with the settling container and be fed by the settling container which is more favorable if the device is adequately designed.

It is also expedient to arrange suction boxes below the contact surface of the perforated belt which boxes are connected with a suction or pumping device. These suction boxes should, however, not extend over the entire area of the conveyor belt but should, in the direction of material passage, be arranged at a certain distance from each other so that alternately there is a zone subjected to a suction draft and a zone not subjected to a suction draft. It has been found that with such an arrangement of the suction boxes according to the present invention, the cleaning effect is essentially better than with a common suction box extending over the entire contact surface, which box is arranged below the contact surface and/or below the conveyor belt.

These and other objects, features, and advantages of the present invention will become more obvious from the following description when taken in connection with the accompanying drawing, which shows, for purposes of illustration only, several embodiments in accordance with the present invention, and wherein.

Figure 1:
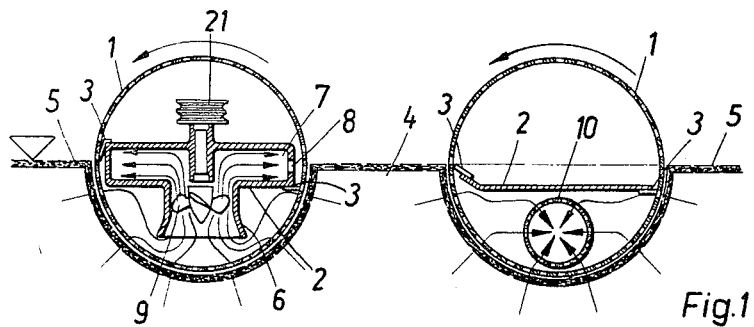
FIGURE 1 is a cross-sectional view through two sieve drums according to the present invention and provided with different suction devices, which sieve drums partially immerse into the treatment liquid.

Referring now to the drawing wherein like reference numerals are used throughout the various views to designate like parts, reference numeral 1 designates in all figures sieve drums which are partially immersed into a treatment liquid 4. Immediately below the liquid level in the sieve drums 1 a baffle 2 consisting, in general, of straight sheets with lateral elastic sealing strips 3 is provided. In the case of the front sieve drum according to FIGURE 1 and the sieve drums according to FIGURE 2 a channel 7 is provided above the baffle plate 2 through which channel is discharged the liquid sucked in through exhaust connection or connections 6 by means of pump 9. By the suction draft, loose material 5 is held to the drum jacket transported through the liquid and is, at the same time, intensely penetrated by the treatment liquid. In that wall of channel 7 directed towards the material, openings 8 are provided approximately at the height of the liquid level through which openings part of the liquid sucked in flows out. In this way, detachment of the loose material 5 from the sieve drum is substantially facilitated.

Another possibility of the suction device and the baffle plate is shown in the right-hand sieve drum in FIGURE 1. Here a baffle plate 2 consists essentially of a flat sheet, the edges of which are again provided with elastic sealing strips 3. However, here the sealing strips are arranged in such a way that, at the intake and the delivery end, they interrupt the suction draft at different levels, whereas the suction draft at the intake of the drum reaches approximately the liquid level and is interrupted at the delivery end of the drum at a certain distance below the liquid level. Thus, detachment of the material 5 from the sieve drum is facilitated. In this design, the exhaust connection is a perforated tube 10 which is arranged in the lower part of the sieve drum. The tube 10 is arranged in such a way that even in the case of larger variations of the liquid level, it lies always below the liquid level.

Figure 2:
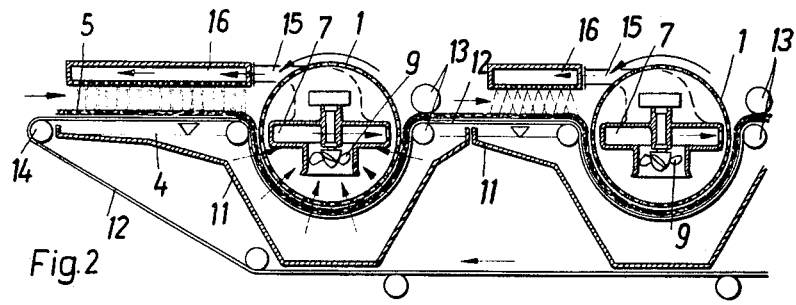
FIGURE 2 is a cross-sectional view through the initial zone of a scouring device according to the present invention.

In the device according to FIGURE 2, an endless conveyor belt 12 serves for transporting the material 5 which conveyor belt 12 extends over several liquid containers 11. For holding and guiding an endless conveyor belt 12, rollers 14 and the lower rollers of the pairs of squeeze rollers 13 are provided. In the device according to FIGURE 2, the liquid sucked out of sieve drums 1 is fed into rinsing boxes 16 by way of line 15. At the intake of each treatment zone the material 5 is first wet-treated by rinsing and then it is treated in a treatment liquid 4. After each treatment zone a pair of squeeze rollers 13 is provided which squeeze excess treatment liquid out of the material. Pump 9 is formed like a fan wheel and can be driven directly by a motor in the sieve drum. In general it is, because of the better accessibility, of advantage to connect the pump by means of V-belt discs 21 and V-belts (not shown) to a drive (not shown) arranged laterally outside the sieve drums 1.

Figure 3:
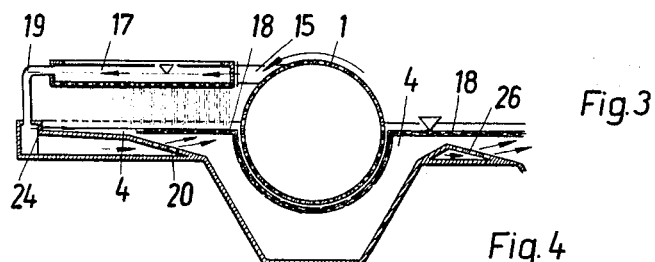
FIGURE 3 is a cross-sectional view through the initial zone of another scouring device in accordance with the present invention.

Instead of closed rinsing boxes 16 as shown in FIGURE 2, also open rinsing boxes 17 as shown in FIGURE 3 can be used. In the construction according to FIGURE 3 instead of a conveyor belt, a floating distance 18 is provided in front of each sieve drum 1 above which floating distance one or several open rinsing boxes 17 are arranged. The rinsing box 17 is provided with an overflow line 19 through which the excess of the liquid fed by pump 9 is discharged and returned into the bath through a perforated bottom part 20 and/or through openings 24 at the bath intake. This creates a flow in the direction of material passage in the bath, which flow floats the material to a sieve drum 1 and over another floating distance 18 to the next sieve drum which is not shown in FIGURE 3. Part of the liquid sucked off and discharged from the further sieve drum can again emerge through a perforated bottom part 26. Above this floating distance again a rinsing box may be arranged.

Figure 4:
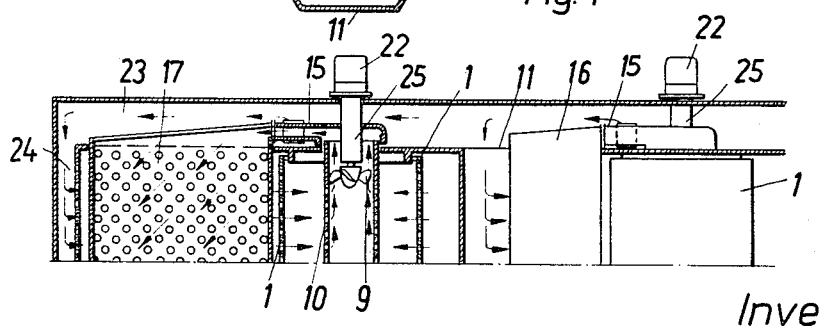
FIGURE 4 is a partial plan view on a scouring device according to the present invention with component parts partially shown in sections.

Instead of passing through rinsing boxes or being returned adjacent to the rinsing boxes, the liquid sucked off may be returned into the bath at the intake through a lateral channel 23. As shown in FIGURE 4, also part of the liquid sucked out of the sieve drums 1 can be returned into the liquid bath at the bath intake directly, whereas another part of the liquid is returned into rinsing boxes 16 and 17. The amount returned into the rinsing boxes may be varied by means of, e.g., a flap or similar device. In the device according to FIGURE 4, perforated tubes 10 are provided in the sieve drums for sucking off the liquid in which tubes 10 a pump 9 is accommodated, which is directly connected to a drive 22 outside the device by means of a shaft 25.

Figure 5:
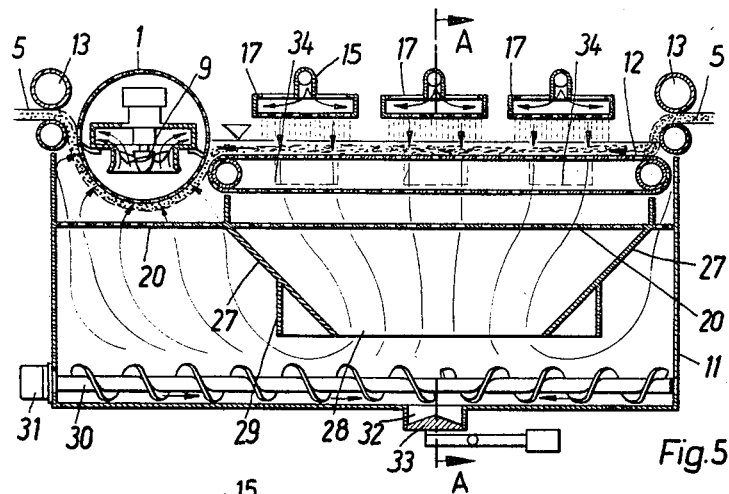
FIGURE 5 is a longitudinal cross-sectional view through another device of the present invention.
Figure 6:
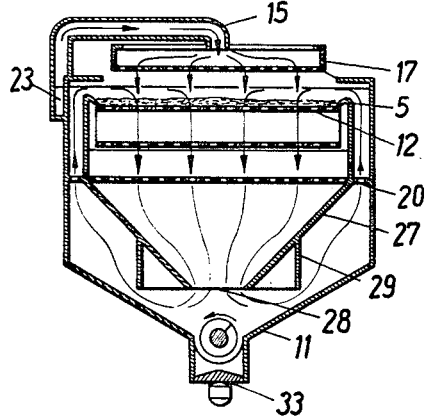
FIGURE 6 is a cross-sectional view, taken along line A—A of the device according to FIGURE 5.
Figure 7:
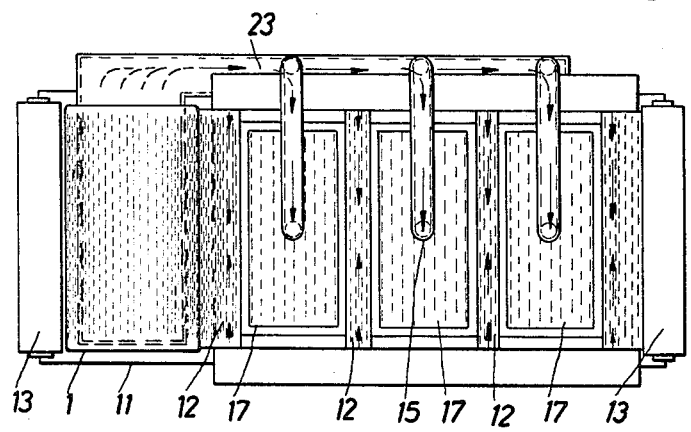
FIGURE 7 is a plan view on the device according to FIGURES 5 and 6.

The device shown in FIGURES 5 to 7 consists essentially of a relatively deep liquid container 11 which serves as a settling container. In that settling container 11, a sieve bottom 20 is arranged which divides the container in an upper treatment space and a lower settling space.

Above the sieve bottom 20 a conveyor belt 12 is arranged in the liquid, the contact surface of which conveyor belt lies below the liquid level by preferably the material thickness, i.e., by the thickness of loose material 5 floated onto the conveyor belt 12. A pair of rollers 13 are arranged at the intake of the device and at the delivery end of the device a sieve drum 1 subjected to a suction draft, again with a pair of rollers 13. In the device shown, pumps 9 are arranged in the sieve drum 1. The pumps suck the liquid through the fibrous material and into rinsing boxes 17 which are arranged just above the liquid level. For this purpose a channel 23 arranged at the side of the device and/or the bath is provided, which channel lies preferably below the liquid level so that it is always filled with liquid, even if the device is stopped and that it need not be filled with liquid again if the device is started anew.

Below the perforated bottom 20 and the conveyor belt 12 a settling box 27 is provided, the lower end of which is conically constricted and provided with an opening 28 through which the dirt may sink down into the lower part of the device which serves as a settling container. In order to slow down the speed of the liquid flow in the lower part of the device serving as a settling container, walls 29 extending vertically downwards are arranged at the settling box 27. For removing the deposited contaminations, a worm conveyor 30 with drive 31 is arranged at the bottom of container 11 and an opening 32 with a suitable cover 33 is provided.

Below the contact surface of the conveyor belt 12, suction boxes 34 are shown by the dashed line.

It has been found that if, according to the present invention, a liquid flow in the direction of the fall of the dirt particles is provided, the cleaning effect is substantially improved. The explanation is that, above all, the contaminations can better settle down. At the points where the contaminations are separated from the material, no detrimental countercurrents occur which would impede settling of those particles.

While I have shown and described several embodiments in accordance with the present invention, it is understood that the same is not limited thereto but is susceptible of numerous changes and modifications as known to a person skilled in the art, and we therefore do not wish to be limited to the details shown and described herein,

I claim:

1. A device for the wet treatment of textile materials which comprises a container means at least partially filled with a treatment liquid, at least one sieve drum means subjected to a suction draft rotatably disposed within said container means, inlet means for introducing the material to be treated to the container means, means associated with the sieve drum means for producing the suction draft causing the liquid to flow from the container into the sieve drum interior thereby forcing said material against the sieve drum means, baffle plate means mounted in the sieve drum means below the liquid level and operable to interrupt the suction draft over a portion of the sieve drum means, said baffle means being provided with an exhaust connection which has a suction opening disposed substantially below the liquid level, channel means communicating with the exhaust connection of the baffle means for the lateral discharge of the treatment liquid and outlet means for removing the material from the container means.

2. The device of claim 1. wherein the exhaust connection is fastened to the baffle plate means and extends conically toward the suction opening.

3. The device of claim 1 wherein the means for producing the suction draft comprises a pump disposed in the sieve drum means on the baffle plate means.

4. The device of claim 1, wherein the container means also contains a conveyor belt means associated with the sieve drum means.

5. The device of claim 1, wherein rinsing means is disposed at the material inlet, said rinsing means communicating with the interior of the sieve drum means for supplying the treatment liquid drawn out of the sieve drum means to said rinsing means.

6. The device of claim 1, wherein the container means also contains a conveyor belt means disposed behind the sieve drum means and rinsing means arranged above said conveyor belt means, said rinsing means communicating with the interior of the sieve drum means for supplying the treatment liquid drawn out of the sieve drum means to said rinsing means.

7. A device according to claim 1, further comprising conveyor belt means disposed behind the sieve drum means, said container means being divided into a suction chamber below the conveyor belt means and into a suction chamber below the sieve drum means, the two suction chambers communicating with each other, and means for returning the treatment liquid drawn off a respective sieve drum means at least partially into the bath above the conveyor belt means.

8. The device according to claim 7, wherein said container means is divided by a sieve bottom means into an upper treatment space and a lower settling space, settling box means disposed below the sieve bottom means in the region of the conveyor belt means and communicating with the upper treatment space, said settling box means terminating in the container means and communicating with the settling space below the sieve drum means.

9. The device according to claim 7, wherein a plurality of suction boxes are provided below the contact surface of the conveyor belt means for subjecting said surface to a suction draft, said suction boxes being arranged at a predetermined distance from each other as seen in the direction of material passage, and said contact surface thereby being divided into several treatment zones subjected to a suction draft and several treatment zones devoid of a suction draft.

10. The device according to claim 7, wherein the suction opening provides a means for drawing in the liquid to produce the suction draft, and additional means are provided for discharging the drawn-in liquid at a level above the lowermost straight sheet of said baffle plate means.

11. The device according to claim 10, wherein the conveyor belt means is immersed in the treatment liquid at a depth which approximately corresponds to the thickness of the material layer, and means are provided for discharging a rinsing spray on said layer from above, utilizing the drawn-in liquid.

12. The device according to claim 1, wherein guide box means are provided for laterally sealing the conveyor belt means, said guide box means provided with openings directed towards the material, the treatment liquid being discharged through said openings.

13. The device according to claim 1, wherein said baffle plate means consist essentially of only straight sheets.

14. The device according to claim 1, wherein the exhaust connection is provided with an exhaust opening.

References Cited

UNITED STATES PATENTS

| | | | |
|---|---|---|---|
| 899,440 | 9/1908 | Shuman | 68—44 X |
| 2,080,635 | 5/1937 | Schramek et al. | 68—205 |
| 2,293,154 | 8/1942 | Lovett | 68—22 X |
| 3,011,328 | 12/1961 | Fleissner | 68—158 |

WILLIAM I. PRICE, *Primary Examiner.*